United States Patent
Ito et al.

(10) Patent No.: US 7,391,310 B2
(45) Date of Patent: Jun. 24, 2008

(54) SEATBELT ALARM DEVICE FOR VEHICLE

(75) Inventors: Hiroyuki Ito, Chita (JP); Masahiro Taguchi, Hazu-gun (JP); Koji Wato, Obu (JP)

(73) Assignee: DENSO CORPORATION, Kariya (JP)

( * ) Notice: Subject to any disclaimer, the term of this patent is extended or adjusted under 35 U.S.C. 154(b) by 471 days.

(21) Appl. No.: 11/073,563

(22) Filed: Mar. 8, 2005

(65) Prior Publication Data
US 2005/0194779 A1 Sep. 8, 2005

(30) Foreign Application Priority Data
Mar. 8, 2004 (JP) .............................. 2004-064649

(51) Int. Cl.
*B60Q 1/00* (2006.01)
(52) U.S. Cl. ................... 340/457.1; 340/667; 280/801.1
(58) Field of Classification Search .............. 340/457.1, 340/686.4, 667, 573.1; 280/801.1, 735; 180/271
See application file for complete search history.

(56) References Cited

U.S. PATENT DOCUMENTS

| | | | |
|---|---|---|---|
| 5,468,014 A | 11/1995 | Gimbel et al. | 280/735 |
| 5,690,356 A | 11/1997 | Lane, Jr. | 280/735 |
| 6,239,695 B1 | 5/2001 | Okada et al. | 340/457.1 |
| 6,371,516 B1 | 4/2002 | Miyagawa | 280/735 |
| 6,755,437 B2 | 6/2004 | Kraft et al. | 280/735 |
| 6,804,595 B1* | 10/2004 | Quail et al. | 701/45 |
| 2002/0129986 A1* | 9/2002 | Aoki | 180/268 |
| 2002/0163171 A1* | 11/2002 | Kraft et al. | 280/735 |
| 2004/0149507 A1* | 8/2004 | Baskin et al. | 180/271 |
| 2005/0062595 A1* | 3/2005 | Hofbeck et al. | 340/457.1 |

FOREIGN PATENT DOCUMENTS

| | | |
|---|---|---|
| JP | A-2001-180272 | 7/2001 |
| JP | A-2002-347486 | 12/2002 |

* cited by examiner

*Primary Examiner*—Phung T. Nguyen
(74) *Attorney, Agent, or Firm*—Posz Law Group, PLC

(57) ABSTRACT

A seatbelt alarm device for a vehicle includes a seat sensor, a seatbelt sensor, a judgment circuit, an alarm unit, and a child seat sensor. The seat sensor detects a mass on a seat of the vehicle. The seatbelt sensor detects whether a seatbelt of the seat is engaged with a seatbelt buckle. The judgment circuit generates a demand for a seatbelt-wear alarm upon determining that a mass sits on the seat and the seatbelt is not engaged according to detection signals of the seat sensor and the seatbelt sensor, respectively. The alarm unit generates the seatbelt-wear alarm. The child seat sensor detects a child seat mounted on the seat. The judgment circuit restricts operation of the alarm unit when the judgment circuit determines that the child seat is mounted to the seat according to a detection signal of the child seat sensor.

11 Claims, 4 Drawing Sheets

SEATBELT ALARM JUDGMENT

| SITTING SWITCH 2 | SEATBELT SWITCH 3 | CHILD SEAT SWITCH 4 | SEATBELT-WEAR ALARM |
|---|---|---|---|
| ON (SITTING) | OFF (WORN) | OFF (MOUNTED) | NO |
| | | ON (NOT MOUNTED) | NO |
| | ON (NOT WORN) | OFF (MOUNTED) | NO |
| | | ON (NOT MOUNTED) | YES |
| OFF (NO SITTING) | OFF (WORN) | OFF (MOUNTED) | NO |
| | | ON (NOT MOUNTED) | NO |
| | ON (NOT WORN) | OFF (MOUNTED) | NO |
| | | ON (NOT MOUNTED) | NO |

SEATBELT ALARM DEVICE FOR VEHICLE

CROSS REFERENCE TO RELATED APPLICATION

This application is based on Japanese Patent Application No. 2004-64649 filed on Mar. 8, 2004, the disclosure of which is incorporated herein by reference.

FIELD OF THE INVENTION

The present invention relates to a seatbelt alarm device for a vehicle and, more particularly, to a seatbelt alarm device that is suitably used for a seat on which a child seat is mounted.

BACKGROUND OF THE INVENTION

Generally, a seatbelt alarm device is mounted in a vehicle for determining whether or not a seatbelt is worn and generating a seatbelt-wear alarm when it is determined that the seatbelt is not worn.

In one known seatbelt alarm device described in JP-1999-70855A, a seat sensor is provided to detect whether or not a passenger sits on a seat and then generates a corresponding signal. Furthermore, a seatbelt sensor is provided to detect whether or not a seatbelt of the seat is worn and then generates a corresponding signal. When it is determined that a passenger sits on the seat without wearing the seatbelt according to the sitting signal and the seatbelt signal, the seatbelt alarm device generates a seatbelt-wear alarm for inducing the passenger to wear the seatbelt. This seatbelt alarm device can be suitably used for seats in a vehicle.

For a seat on which a child seat is mounted with the seatbelt, the seat sensor will detect the weight of the child seat and generate a corresponding sitting signal. Furthermore, the seatbelt sensor will detect that the seatbelt is worn and generate a corresponding seatbelt signal. Thus, the above-described seatbelt alarm device determines if the seatbelt of the seat is worn irrespective of whether a child sits in the child seat or not.

However, in the case where the child seat is mounted on the seat with fasteners or the like as opposed to the seatbelt, the seat sensor will detect the weight of the child seat and generate the sitting signal and the seatbelt sensor will detect that the seatbelt is not being worn. Accordingly, the seatbelt alarm device falsely determines that a passenger sits on the seat without wearing the seatbelt, thereby generating an incorrect seatbelt-wear alarm.

Therefore, the vehicle may be provided with a switch near a driver so that the driver can manually cancel the seatbelt-wear alarm when the child seat is mounted to the seat. However, this method may require frequent operation of the switch by the driver, which may become impractical or inconvenient.

SUMMARY OF THE INVENTION

In view of the above-described disadvantage, it is an object of the present invention to provide a vehicle seatbelt alarm device that generates a proper seatbelt-wear alarm without the operation of a driver even when a child seat is mounted to the seat.

According to the present invention, a seatbelt alarm device for a vehicle is provided with a seat sensor, a seatbelt sensor, a judgment circuit, an alarm unit, and a child seat sensor. The seat sensor detects a passenger sitting on a seat of the vehicle based on a load exerted on the seat. The seatbelt sensor detects that a seatbelt of the seat is worn based on a fixing of a wear end of the seatbelt. The judgment circuit generates a demand for generating a seatbelt-wear alarm when the judgment circuit determines that a passenger sits on the seat without wearing the seatbelt according to detection signals of the seat sensor and the seatbelt sensor. The alarm unit generates the seatbelt-wear alarm according to the demand. The child seat sensor detects a child seat that is mounted on the seat without using the seatbelt. The judgment circuit restricts the alarm unit from generating the seatbelt-wear alarm irrespective of whether the seatbelt is worn or not when the judgment circuit determines that the child seat is mounted on the seat according to a detection signal of the child seat sensor.

That is, even though the seat sensor detects a passenger sitting on the seat when the child seat is fixed on the seat, the judgment circuit can properly determine that the detection is due to the child seat fixed on the seat without using the seatbelt, thus not generating a demand of the seatbelt-wear alarm. Accordingly, a false seatbelt-wear alarm can be restricted even for the seat where the child seat is mounted, without an operation of a driver.

Preferably, the child seat has a fastening unit, which is inserted into a hole formed on a fastening structure mounted near the seat so that the child seat is detachably fixed to the seat. The child seat sensor is a switch, which is attached to the fastening structure to operate while the fastening unit is inserted into and withdrawn from the hole.

Accordingly, a mounting of the child seat on the seat can be readily determined according to an action of the fastening unit of the child seat.

More preferably, the seat sensor is constructed of multiple normally-OFF switches connected in parallel. The seatbelt sensor and the child seat sensor are normally-ON switches. The judgment circuit is a switch circuit constructed of the seat sensor, the seatbelt sensor, the child seat sensor and the alarm unit connected in series. The judgment circuit is supplied with a power source voltage at two ends.

Accordingly, the judgment circuit can be simply constructed with a low cost to provide proper actuation of a seatbelt-wear alarm.

Other objects, features and advantages of the present invention will become more apparent from the following detailed description made with reference to the accompanying drawings, in which:

DETAILED DESCRIPTION OF THE PREFERRED EMBODIMENTS

A first preferred embodiment of the present invention will be described with reference to FIGS. 1-7.

Figure 1:
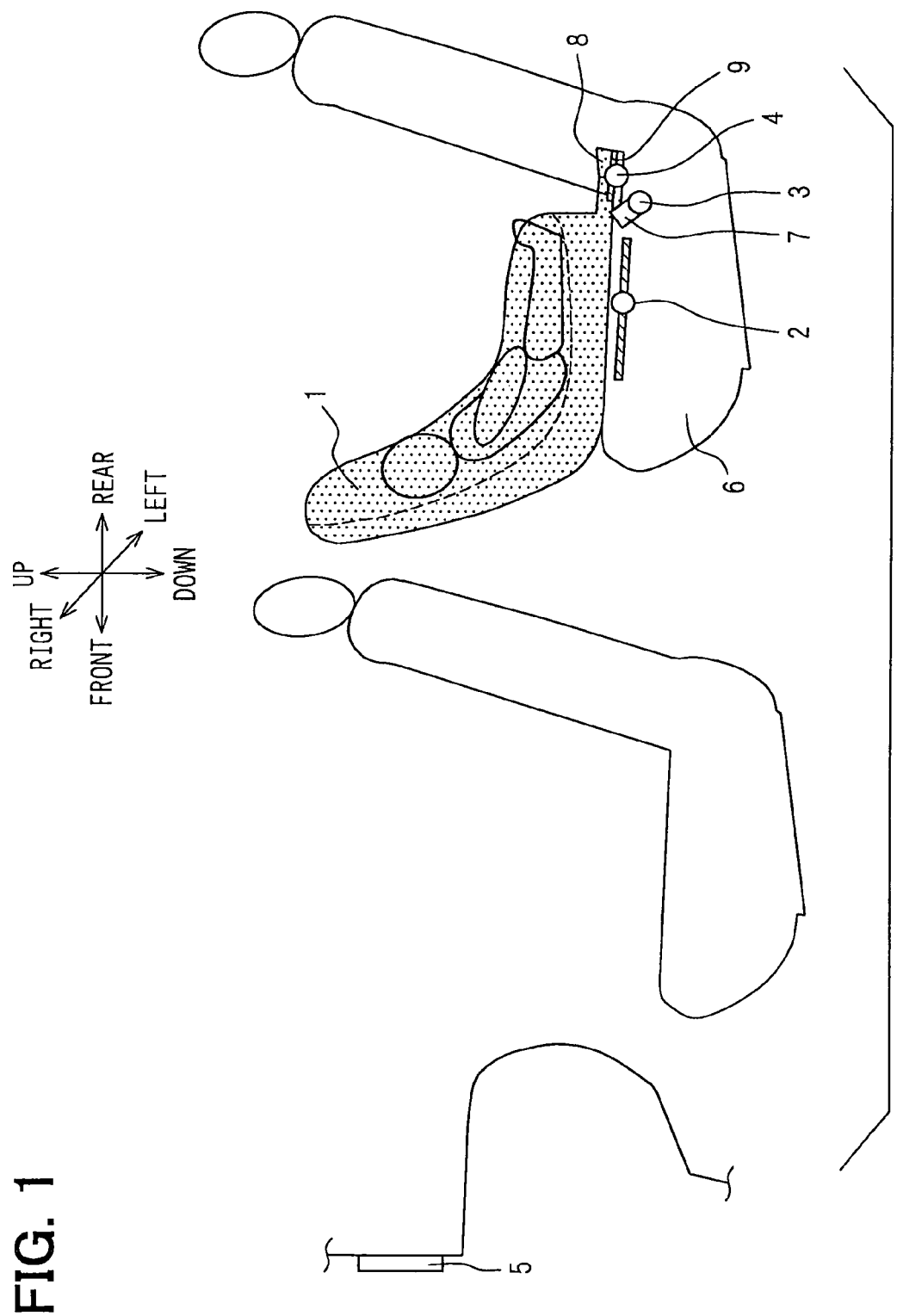
FIG. 1 is a partial side view of a vehicle interior including a seatbelt alarm device according to a first embodiment of the present invention.

A seatbelt alarm device for a vehicle is provided with a sitting switch 2, a seatbelt switch 3, a child seat switch 4, and a seatbelt alarm lamp 5, as shown in FIG. 1. A child seat 1 is mounted on an upper surface of a sitting portion of a seat 6 without using a seatbelt.

The sitting switch 2 is constructed of multiple film switches 15-18 (shown in FIG. 2 and described later), which are connected with each other in parallel and laid on a seat cushion that is enfolded by a cover of the seat 6.

The seatbelt switch 3 is fixed to a seatbelt buckle 7, which is mounted at a side surface of the sitting portion of the seat 6. A fastening unit (not shown) is attached to the seatbelt so that the seatbelt can be fastened when the fastening unit is inserted into a hole formed in the seatbelt buckle 7. While the fastening unit is inserted into or withdrawn from the hole, that is, while the seatbelt is fastened or unfastened, the seatbelt switch 3 will intermittently operate.

The child seat switch 4 is fixed to a child-seat buckle 8, which is accommodated in the seat 6 near a boundary between a back portion and the sitting portion of the seat 6. The child-seat buckle 8 is provided with a hole, which is disposed at the lower end of the back portion of the seat 6 and extends horizontally rearward. The child seat 1 is provided with a rod 9, which may also be referred to hereinafter as a fastening unit, protruding from a rear side surface of a sitting portion of the child seat 1, in which a front-rear direction corresponds to a longitudinal direction of the vehicle. While the rod 9 is inserted into or withdrawn from the hole formed in the child-seat buckle 8, that is, the child seat 1 is attached to or detached from the seat 6, the child seat switch 4 will correspondingly intermittently operate.

Specifically, a lever (not shown) is provided for each of the child-seat buckle 8 and the seatbelt buckle 7 to face the hole thereof. Each lever is biased inward in a radial direction of the hole by a spring (not shown). When the fastening unit of the seatbelt is inserted into the seatbelt buckle 7 or the rod 9 of the child seat 1 is inserted into the hole of the child seat buckle 8, the respective lever will be displaced radially outward of the hole so that the seatbelt switch 3 or the child seat switch 4 is turned on. On the other hand, when the fastening unit or the rod 9 is withdrawn from the respective hole, the respective lever moves radially inward of the hole to return to its original position due to a returning force of the spring so that the seatbelt switch 3 or the child seat switch 4 is turned off.

During installation, the child seat 1 is pushed toward the rear side of the vehicle such that the rod 9 aligns with the hole of the child-seat buckle 8. The rod 9 is inserted into the hole of the child-seat buckle 8, so that the child seat 1 is fixed to and restrained by the seat 6.

Moreover, the seatbelt buckle 7 and the child-seat buckle 8 are separately provided with a depression unit (not shown), which may alternatively be referred to as an unfastening unit. When a user depresses the depression units of the buckles 8 and 7, the rod 9 and the fastening unit of the seatbelt are unfastened from the buckles 8 and 7, respectively. Then, the seatbelt and the child seat 1 can be detached from the buckles 7 and 8, respectively.

Alternatively, the child-seat buckle 8 and the rod 9 may be attached to the child seat 1 and the seat 6, respectively. Moreover, the rod 9 and the child-seat buckle 8 may be replaced by any other restraint devices capable of detachably engaging each other.

The seatbelt alarm lamp 5 is mounted on an instrument panel in front of a driver seat of the vehicle. When it is determined that the seatbelt is not being worn by a passenger, the seatbelt alarm lamp 5 is turned on.

Figures 2, 3:
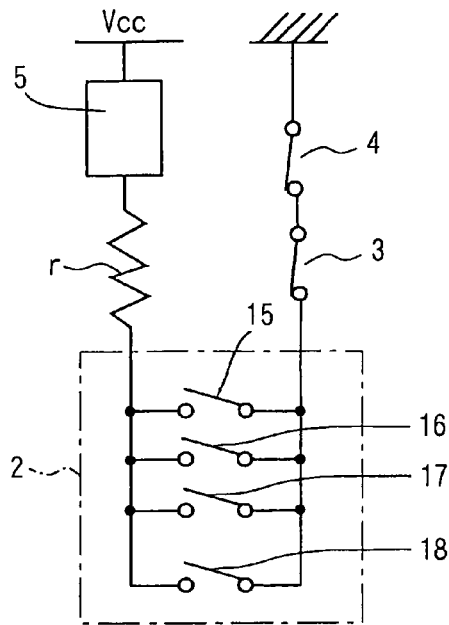
FIG. 2 is a schematic diagram of a circuit of the seatbelt alarm device according to the first embodiment.
FIG. 3 is a table of operational conditions for the seatbelt alarm device of the first embodiment of the present invention.
Figure 4:
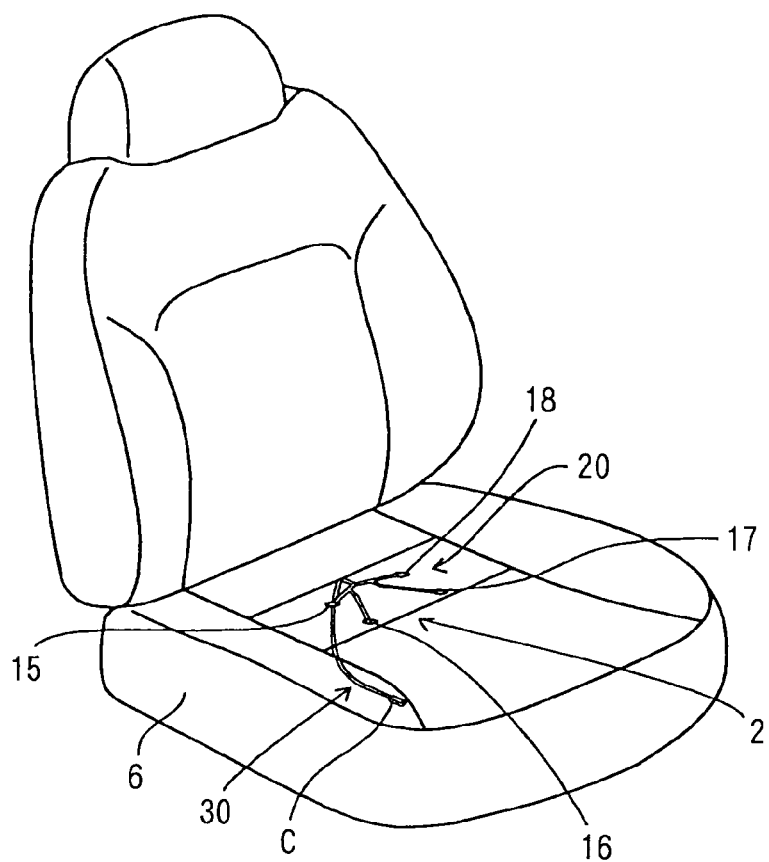
FIG. 4 is a perspective view of a vehicle seat including a seat sensor of the seatbelt alarm device according to the first embodiment of the present invention.
Figure 5:
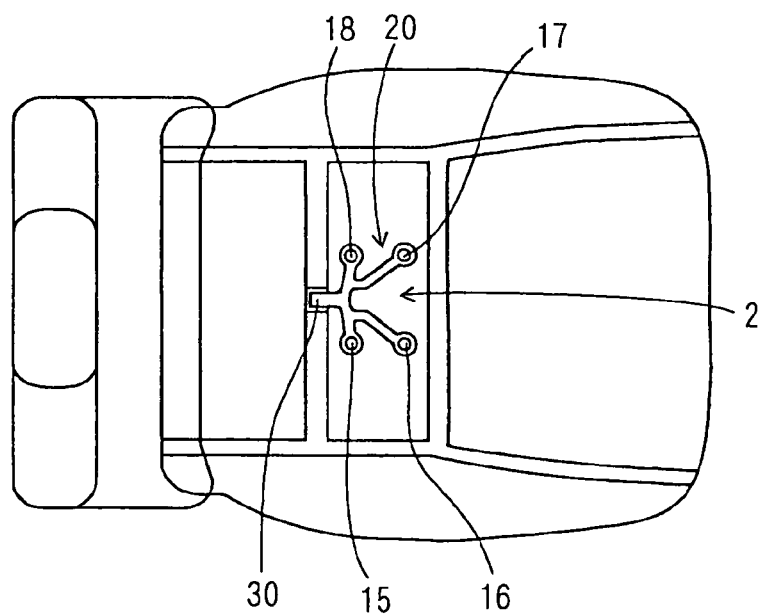
FIG. 5 is a plan view of the seat of FIG. 4.

Next, with reference to FIG. 2, a judgment circuit of the seatbelt alarm device will be described.

The judgment circuit includes the sitting switch 2, the seatbelt switch 3, the child seat switch 4, the seatbelt alarm lamp 5, and a resistor r connected in series. The sitting switch 2 is constructed of the film switches 15-18 that are connected in parallel. The resistor r is provided for restricting a current through the circuit. One end of the switch circuit is supplied with a predetermined voltage by a power supply (not shown) and the other end thereof is grounded.

The film switches 15-18 are normally-OFF switches. The child seat switch 4 and the seatbelt switch 3 are normally-ON switches. Referring to FIG. 3, a seatbelt-wear alarm will be generated in the case where each of the sitting switch 2, the seatbelt switch 3, and the child seat switch 4 are ON. This will occur when it is determined that there is a mass sitting on the seat 6, the seatbelt is not worn, and the child seat 1 is not mounted to the child seat buckle 8. Therefore, when the seatbelt is not worn in the case where the seatbelt ought to be worn, the seatbelt-wear alarm will be generated for urging a passenger to wear the seatbelt.

A construction of the sitting switch 2 will now be described referring to FIGS. 4-7.

The sitting switch 2 includes the film switches 15-18 and is formed by stamping a film to have a tree portion 20 having a branched configuration and a line portion 30 linearly extending from the tree portion 20. The sitting portion of the seat 6 is provided with the seat cushion enfolded by the cover made of hide or cloth. The tree portion 20 and a part of the line portion 30 are laid on the cushion and enclosed in the cover. The remainder of the line portion 30 passes through a gap in the sitting portion to downwardly extend along the side surface of the seat portion. The remainder of the line portion 30 is attached to a connector C that is fixed to the bottom of the seat 6.

Figure 6:
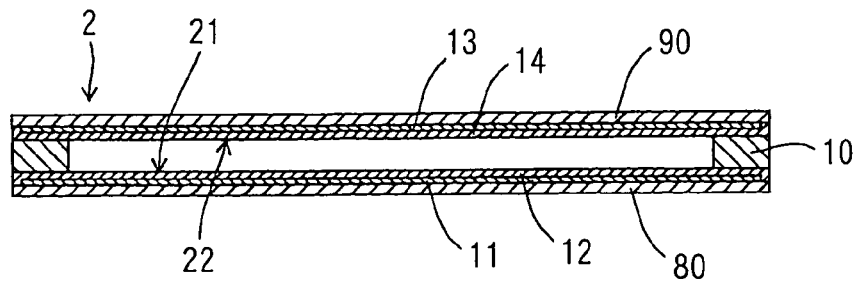
FIG. 6 is a cross-sectional view of the sitting switch of FIG. 4 when the seat is vacant.
Figure 7:
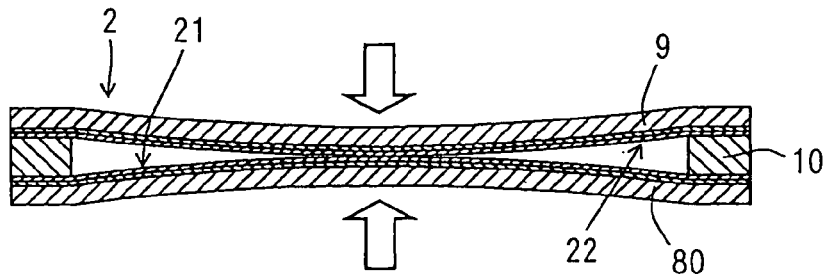
FIG. 7 is a cross-sectional view of the sitting switch of FIG. 4 when the seat is occuppied.

FIG. 6 shows a cross section of film switch 15 when the seat 6 is vacant and FIG. 7 shows that when the seat 6 is occupied. Film switches 16-18 have the same construction as film switch 15.

The film switch 15 is one branch of the tree portion 20 and is provided with a lower film 80, an upper film 90, a spacer film 10, electrically conductive layers 11 and 12, and electrically conductive layers 13 and 14. The spacer film 10 is made of a resin film and sandwiched between the lower film 80 and the upper film 90. Electrically conductive layers 11 and 12 are formed on the lower film 80 by printing. Electrically conductive layers 13 and 14 are formed under the upper film 90 by printing.

Electrically conductive layers 11 and 13 are formed of a silver paste. Electrically conductive layers 12 and 14 are formed of a carbon paste. The electrically conductive layers 11 and 12 define a positive power-supply wire and a connecting point 21 at one side of the film switch 15 (film switch 16, 17 or 18). Electrically conductive layers 11 and 12 are connected with the positive power-supply wire at the connecting point 22. Electrically conductive layers 13 and 14 define a negative power-supply wire and a connecting point 22 at the other side of the film switches 15 (film switch 16, 17 or 18). Electrically conductive layer 13 and 14 are is connected with the negative power-supply wire at the connecting point 22. The positive and negative power-supply wires extend along the line portion 30 to be connected with a terminal of the connector C. When there is a mass sitting on the seat 6, the connecting point 21 contacts the connecting point 22, as shown in FIG. 7, so that the film switch 15 is turned on. Similarly, the film switches 16-18 can also be turned on.

Figure 8:
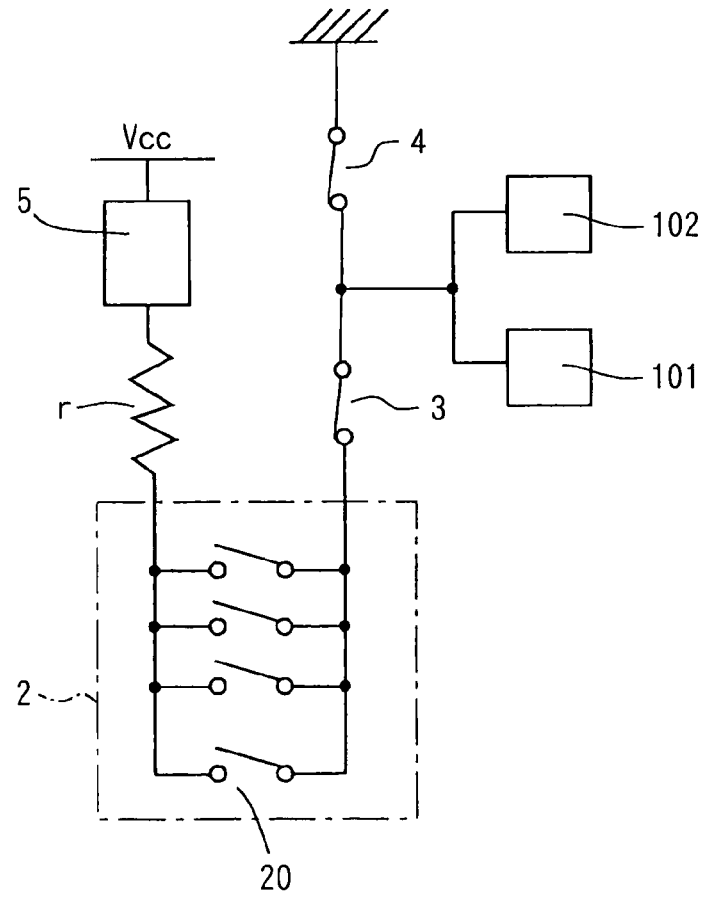
FIG. 8 is a schematic diagram of a circuit of a seatbelt alarm device according to a second embodiment of the present invention.

A second embodiment will now be described with reference to FIG. 8. According to this embodiment, a potential of a connecting point between the seatbelt switch 3 and the child seat switch 4 in the switch circuit (referring to FIG. 2) is transmitted to a power window control unit 101 and an airbag control unit 102. The power window control unit 101 operates to enable and/or disable a power window adjacent to the seat 6. The airbag control unit 102 operates to enable and/or disable an airbag corresponding to the seat 6.

In the case where the child seat 1 is not mounted on the seat 6, the sitting switch 2 is OFF and the child seat switch 4 is ON. This outputs a low potential to the power window control unit 101 and the airbag control unit 102. On the other hand, when the child seat 1 is mounted on the seat 6, the sitting switch 2 is ON and the child seat switch 4 is OFF. This outputs a high potential to the power window control unit 101 and the airbag control unit 102.

In the case where a passenger sits on the seat 6, the sitting switch 2 is ON and the child seat switch 4 is also ON. This outputs a low potential to the power window control unit 101 and the airbag control unit 102.

Accordingly, the power window control unit 101 and the airbag control unit 102 can determine whether the child seat 1 is mounted on the seat 6 or not. Thus, when the child seat switch 4 detects the presence of a child seat 1 mounted on the seat 6, the power window control unit 101 disables or restricts operation of the power window and the airbag control unit 102 disables or changes an operational mode of the airbag.

What is claimed is:

1. A seatbelt alarm device for a vehicle, comprising:
   a seat sensor for detecting a mass on a seat of the vehicle based on a load exerted on the seat;
   a seatbelt sensor for detecting an engagement of a seatbelt of the seat with a seatbelt buckle;
   a judgment circuit that generates a demand for a seatbelt-wear alarm upon determining that a mass sits on the seat and the seatbelt is not engaged according to detection signals of the seat sensor and the seatbelt sensor, respectively;
   an alarm unit for generating the seatbelt-wear alarm according to the demand from the judgment circuit; and
   a child seat sensor for detecting a child seat mounted on the seat without using the seatbelt, wherein
   the judgment circuit restricts the alarm unit from generating the seatbelt-wear alarm irrespective of whether the seatbelt is worn or not when the judgment circuit determines that the child seat is mounted to the seat according to a detection signal of the child seat sensor.

2. The seatbelt alarm device according to claim 1, further comprising:
   a fastening structure attached to the seat having a hole adapted to receive a fastening unit of the baby seat; and
   the child seat sensor includes a switch attached to the fastening structure that operates in response to the fastening unit of the baby seat engaging and disengaging the hole of the fastening structure.

3. The seatbelt alarm device according to claim 2, wherein:
   the seat sensor includes a plurality of normally-OFF switches connected in parallel;
   the seatbelt sensor includes a normally-ON switch;
   the child seat sensor includes a normally-ON switch; and
   the judgment circuit includes the seat sensor, the seatbelt sensor, the child seat sensor, and the alarm unit connected in series.

4. The seatbelt alarm device according to claim 3, wherein:
   the child seat sensor is operable to generate a first signal for restricting operation of a power window and a second signal for changing an operation of an airbag according to a detection of the child seat.

5. A vehicle seat, comprising:
   a seat bottom;
   a seatback;
   a seatbelt sensor operable to generate an alarm when a seatbelt is unbuckled;
   a fastening structure supported by at least one of the seat bottom and the seatback; and
   a child seat sensor operable to detect the presence of a portion of a child seat in mounting engagement with the fastening structure, said child seat sensor operable to override the generation of the alarm by the seatbelt sensor.

6. The vehicle seat of claim 5, wherein the seatbelt sensor and child seat sensor are connected in series.

7. The vehicle seat of claim 5, wherein the child seat sensor includes a normally-ON electrical switch that opens upon the fastening structure becoming engaged by the portion of the child seat.

8. The vehicle seat of claim 7, wherein the seatbelt sensor includes a normally-ON switch connected in series with the child seat sensor.

9. The vehicle seat of claim 7, further comprising:
   a seat sensor for detecting the presence of a mass on the vehicle seat based on a force created by the mass.

10. The vehicle seat of claim 9, wherein the seat sensor includes a plurality of normally-OFF electrical switches connected in parallel.

11. The vehicle seat of claim 5, further comprising:
    a power window control unit for restricting an operation of a power window upon the child seat sensor detecting the portion of the child seat in mounting engagement with the fastening structure; and
    an airbag control unit for changing an operation of an airbag upon the child seat sensor detecting the portion of the child seat in mounting engagement with the fastening structure.

* * * * *